United States Patent [19]

Chapman et al.

[11] Patent Number: 5,970,063
[45] Date of Patent: Oct. 19, 1999

[54] METHOD FOR UNACKNOWLEDGED DATA FRAME DELIVERY IN A NOISY WIRELESS ENVIRONMENT

[75] Inventors: Randy G. Chapman, Coquitlam; Andrew S. Wright, Vancouver, both of Canada

[73] Assignee: Telefonaktiebolaget LM Ericsson, Stockholm, Sweden

[21] Appl. No.: 08/903,821

[22] Filed: Jul. 31, 1997

[51] Int. Cl.⁶ .................................................. H04L 12/56
[52] U.S. Cl. ..................... 370/346; 370/449; 340/825.49
[58] Field of Search .................................. 370/346, 465, 370/449; 340/825.07, 825.08, 825.49; 395/200.54

[56] References Cited

U.S. PATENT DOCUMENTS

| | | | |
|---|---|---|---|
| 4,924,457 | 5/1990 | Shimizu | 370/346 |
| 5,185,795 | 2/1993 | Bright . | |
| 5,471,469 | 11/1995 | Flammer, III et al. | 370/346 |
| 5,528,605 | 6/1996 | Ywoskus et al. . | |
| 5,588,009 | 12/1996 | Will . | |
| 5,710,885 | 1/1998 | Bondi | 395/200.54 |
| 5,822,544 | 10/1998 | Chaco et al. | 340/825.49 |

OTHER PUBLICATIONS

European Patent Office, Standard Search Report, Feb. 26, 1998, File No. RS 100268.

Shenzhen Starsoft Computer, Inc., A New Selective Retransmitted ARQ System, Nov. 29, 1993, XP 000436123, 1993 IEEE, pp. 1815–1821.

Ender Ayanoglu et al., Airmail A Link–Layer Protocol For Wireless Networks, 8452 Wireless Networks, Feb. 1, 1995, No. 1, Amsterdam, NL, pp. 47–59.

Richard Cam and Cyril Leung, Throughput Analysis of Some ARQ Protocols In The Presence of Feedback Errors, XP 000642235, 1997 IEEE, Transactions on Communications, vol. 45 No. 1, Jan. 1997, pp. 35–44.

*Primary Examiner*—Chi H. Pham
*Assistant Examiner*—Maikhanh Tran
*Attorney, Agent, or Firm*—Jenkens & Gilchrist PC

[57] ABSTRACT

Fading on a data link prevents a mobile station from acknowledging a received base station poll message. Responsive thereto, the data link is transitioned to an unacknowledged mode of operation. A group of frames of a data communication are then transmitted to the mobile station with no base station expectation of receiving a mobile station acknowledgment. Following group frame transmission, the data link is transitioned back to acknowledged mode of operation. To insure delivery of the data communication, the sent frames a queued (stored) by the base station until such time as a delivery confirmation with respect to the group of frames can be obtained.

15 Claims, 4 Drawing Sheets

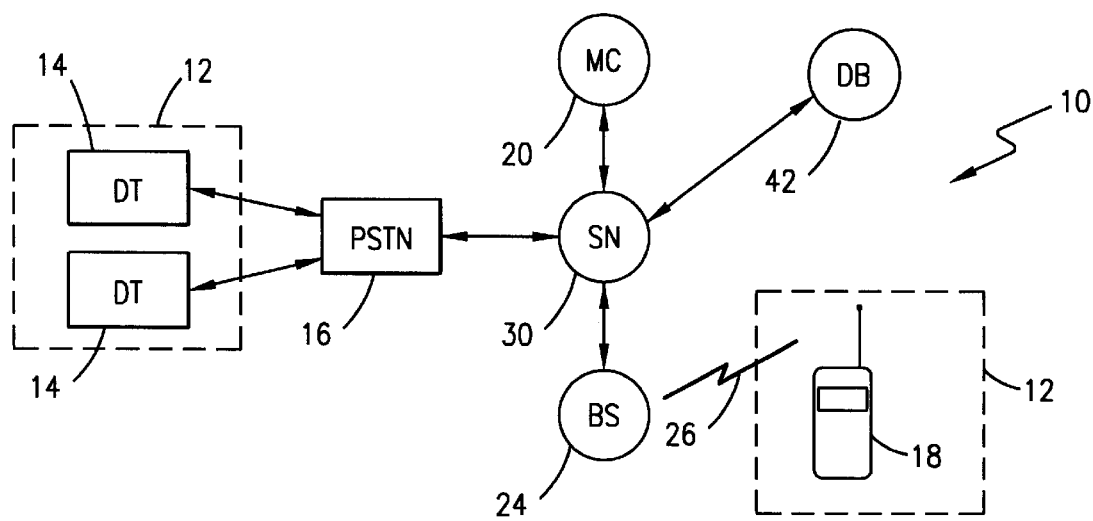
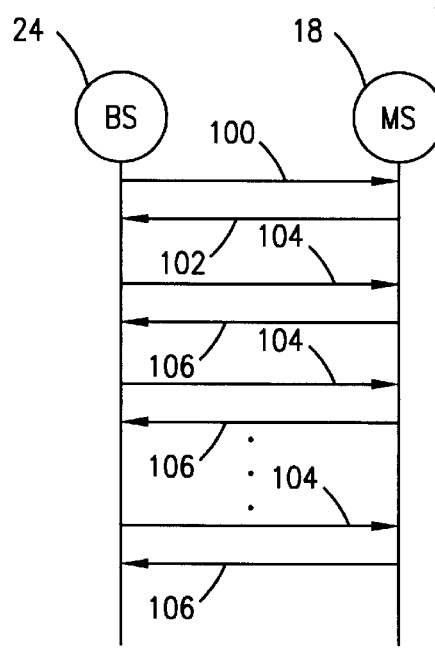
FIG. 2
(PRIOR ART)
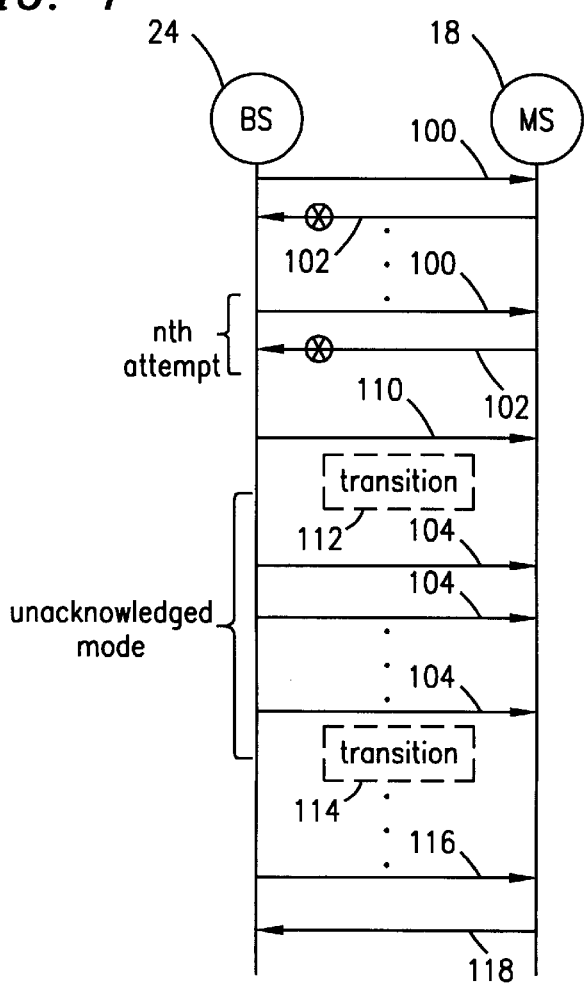

METHOD FOR UNACKNOWLEDGED DATA FRAME DELIVERY IN A NOISY WIRELESS ENVIRONMENT

BACKGROUND OF THE INVENTION

1. Technical Field of the Invention

The present invention relates to the delivery of data over a wireless communications link and, in particular, to a method for implementing data delivery without requiring immediate delivery acknowledgment.

2. Description of Related Art

The radio environment utilized for wireless communications systems presents several conditions which sometimes cause problems with effectuating communication. One of these conditions is extreme fading. Fading in this context refers to a reduction in signal strength of a radio frequency communication at a receiver due to atmospheric propagation effects such as reflection, scattering, refraction, absorption or dispersion. It has been noted in bi-directional wireless personal communications systems (including cellular and paging systems) that the adverse affects of fading are particularly experienced with respect to communications transmitted on the uplink/reverse channel (i.e., from mobile station to base station). As such, a mobile station may have little difficulty in receiving base station communications broadcasts on the downlink/forward channel, while at the same time the base station cannot receive mobile station uplink communications.

As a prerequisite to establishing a data communications connection between a serving network and a mobile station in a wireless communications system, the network often first polls for the mobile station. If no response to the poll message is thereafter received from the mobile station, no communications connection is established to effectuate data communication delivery. If the poll message is acknowledged by the mobile station, a communications connection is established and frames of the data communication are thereafter sent to the mobile station. Unless the communications protocol being used specifies otherwise, reception of each of the frames by the mobile station is typically acknowledged.

In many instances, the fading environment does not prevent the mobile station from receiving the poll message. Rather, the problem is that the page response message sent by the mobile station is not received by the network base station. Within such a fading environment, there is a high probability that if the mobile station can successfully receive and decode the poll message, then frames of the data communication could also be successfully received for at least a short time thereafter. In this situation, a more efficient use of limited radio environment resources would be obtained if, instead of waiting for the fading condition to subside, network delivery of the frames of the data communication could be effectuated at that point in time without requiring mobile station acknowledgment.

SUMMARY OF THE INVENTION

Following the transmission of a predetermined number of unacknowledged poll messages over a data link to a mobile station, an operative transition of the data link is made to an unacknowledged communications mode. At that point, the network begins transmitting frames of a data communication to the mobile station. No mobile station acknowledgment of these frame transmissions is expected by the network. The transmitted frames of the data communication are further queued (stored) by the network awaiting confirmation of delivery. Following delivery, an operative transition of the data link back to an acknowledged communications mode is made. If the mobile station thereafter confirms the prior delivery of the data communication, the queued frames are dropped.

BRIEF DESCRIPTION OF THE DRAWINGS

A more complete understanding of the method of the present invention may be acquired by reference to the following Detailed Description when taken in conjunction with the accompanying Drawings wherein:

FIG. 1 is a block diagram of a wireless communications system in which the present invention may be implemented;

FIG. 2 is a message flow and nodal operation diagram illustrating a prior art procedure for acknowledged mode delivery of a data communication to a mobile station;

FIG. 3 is a message flow and nodal operation diagram illustrating a present invention procedure for unacknowledged mode delivery of a data communication to a mobile station in a fading environment;

DETAILED DESCRIPTION OF THE INVENTION

Figure 4:
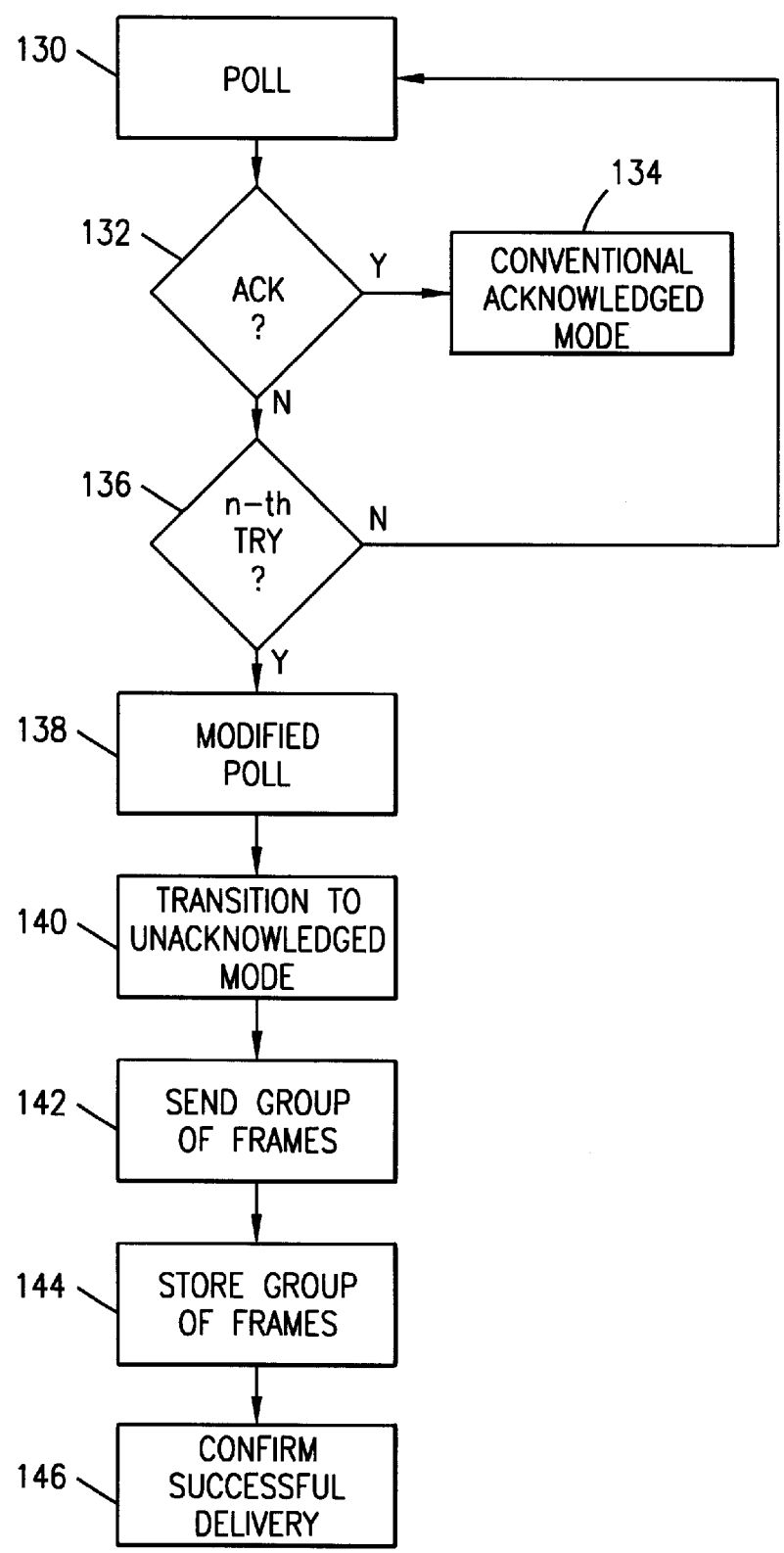
FIG. 4 is a flow diagram illustrating operation of a network side of the wireless communications system of FIG. 1 to support the unacknowledged communications mode of operation of FIG. 3.

Reference is now made to FIG. 1 wherein there is shown a block diagram of a wireless communications system 10 in which the present invention may be implemented. The wireless communications system 10 supports one or more subscriber data services (such as short message and electronic mail delivery) for use by subscribers in conjunction with other communications services such as, for example, cellular telephone service or paging service. The purpose of the subscriber data services is to provide a means for transferring subscriber data messages between message entities (MEs) 12 using the communications environment provided by the wireless communications system 10.

The message entities 12 participating in the subscriber data service comprise data terminals (DTs) 14 connected to the fixed telephone network 16 (comprising a public switched telephone network (PSTN) or other equivalent/ similar telephone network). The message entities 12 further comprise the subscriber mobile stations (MS) 18 operating within the wireless communications system 10. In this context, it should be understood that the mobile stations 18 may comprise cellular telephones, paging devices or the like wireless communications devices. Subscriber data messages must originate with or terminate at one of the message entities 12 comprising the subscriber mobile stations 18.

Multiple message centers (MC) 20 are provided and connected to the fixed telephone network 16 and to the wireless communications system 10. Each message center 20 is a multi-media platform that functions as a store and forward center for receiving and delivering subscriber data messages between the message entities 12. The subscriber data messages are stored in the message center 20, and then subsequently forwarded to the addressee message entity at an appropriate time.

The wireless communications system 10 further includes a plurality of base stations 24 for effectuating radio frequency communications over an air interface 26 with the mobile stations 18. Each base station 24 is connected through a centralized switching node (such as a cellular system mobile switching center (MSC)) 30 to the fixed telephone network 16. The switching node 30 operates to control base station 24 operation, maintain a record in a data base 42 (like a home location register or visitor location register) of mobile station 18 operating parameters and location within the network 10 and switch, either within the system 10 or with the fixed telephone network 16, those communications originated by or terminated at the mobile stations 18. The switching nodes 30 are further connected to the message centers 20 used in providing the subscriber data services. It is via the base station 24 and the air interface 26 that a data communication is sent from the message center 20 and/or switching node 30 to the mobile station 18.

Reference is now made to FIG. 2 wherein there is shown a message flow and nodal operation diagram illustrating a prior art procedure for acknowledged mode delivery of a data communication to a mobile station. A base station 24 relays a network (i.e., switching node 30) generated poll message 100 over the air interface to the mobile station 18. Responsive to receipt of the poll message 100, the mobile station 18 sends an acknowledgment 102 back to the base station. Responsive to base station 24 receipt of the acknowledgment 102, and relaying of the acknowledgment to the switching node 30, individual frames 104 of the data communication are then sent through the base station and over the air interface to the mobile station 18. Responsive to receipt of each frame 104, the mobile station 18 sends an acknowledgment 106 back to the base station 24. If no acknowledgment 106 is received, the unacknowledged frame 104 is retransmitted through the base station to the mobile station 18.

As discussed previously, a fading environment present with respect to the air interface can adversely affect the operation of the acknowledged operation method of FIG. 2 for data communication delivery. While the fading environment may not prevent the mobile station from receiving the network broadcast poll message 100, it could prevent the poll acknowledgment 102 sent by the mobile station from being received by the network. In spite of this interference with uplink/reverse channel communications and the inability to receive the acknowledgment messages 102, there is a high probability that if the mobile station can successfully receive and decode the poll message 100 sent on the downlink/forward channel, then frames 104 of the data communication could also be successfully received for at least a short time thereafter.

Reference is now made to FIG. 3 wherein there is shown a message flow and nodal operation diagram illustrating a present invention procedure for unacknowledged mode delivery of a data communication to a mobile station in a fading environment. A base station 24 relays a network poll message 100 over the air interface to the mobile station 18. Responsive to receipt of the poll message 100, the mobile station 18 sends an acknowledgment 102 back to the base station. This acknowledgment 102 is not, however, successfully received by the base station 24 (as generally indicated by "X"). The network then re-tries the poll message 100. Again, the mobile station 18 sends an acknowledgment 102 that is not received by the base station 24. Following the making of a predetermined number (n) of tries to poll 100 for (and receive an acknowledgment 102 from) the mobile station 18, the network sends a modified poll message 110 through the base station 24 to the mobile station indicating an operative transition 112 of the data link supported by the air interface from the conventional acknowledged communications mode of operation to an unacknowledged communications mode. Responsive to receipt of the modified poll message 110, the mobile station 18 does not send an acknowledgment message 102 as before, but instead waits for the network to continue with the transmission of a group of frames 104 of the data communication relayed through the base station 24. Furthermore, the mobile station does not send an acknowledgment message 106, as before, with respect to each frame transmission. The modified poll message 110 may, if desired, be included in with the transmitted group of frames. Following completion of the data communication transmission in the unacknowledged communications mode of the group of frames, the data link supported by the air interface transitions 114 back to its conventional acknowledged communications mode of operation. When the fading condition later subsides, the network requests 116 that the mobile station confirm 118 the prior successful receipt of the transmitted group of frames 104.

Reference is now made to FIG. 4 wherein there is shown a flow diagram illustrating operation of a network side of the wireless communications system of FIG. 1 to support the unacknowledged communications mode of operation of FIG. 3. In step 130, a poll message is sent to the mobile station. A determination is then made in step 132 as to whether an acknowledgment is received. If yes, the conventional acknowledged mode of operation for data communication frame delivery is executed in step 134. If no, a determination is made in step 136 as to whether n unsuccessful (i.e., unacknowledged) poll messages have been sent. If not, the process returns to step 130 to send another poll message. If yes, a modified poll message is sent to the mobile station in step 138 signaling an operative transition (step 140) of the data link supported by the air interface from the conventional acknowledged communications mode of operation to an unacknowledged communications mode. The network then begins to send in step 142 a group of frames of the data communication. No acknowledgment of the frame transmissions of step 142 is expected. Again, if desired, the modified poll message may be included in with the transmitted group of frames. The frames within the group are stored in step 144 (at a level above the data link) until such later time as delivery can be confirmed. Successful delivery of the group of frames is then confirmed when the fading condition later subsides and the stored frames are dropped in step 146.

Figure 5:
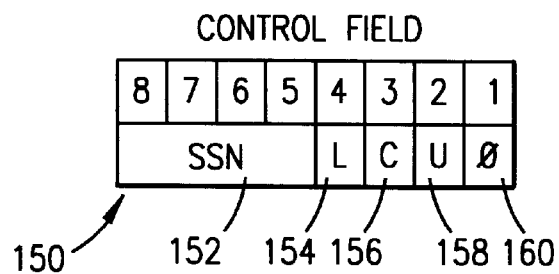
FIG. 5 is a formatting diagram of the control field byte in a downlink unacknowledged communications mode frame transmission.

Reference is now made to FIG. 5 wherein there is shown a formatting diagram of the control field byte 150 in a downlink unacknowledged communications mode frame transmission. Bits five through eight of the control field byte 150 store a transmit send sequence number (SSN) 152 for the frame (in the plurality of frames) of the transmitted data communication being sent. The send sequence number is compared by a mobile station to an expected sequence number (ESN) in order to confirm sequential reception of frames in the transmitted group. Bit four 154 of the control field byte 150 indicates whether the frame being sent is the last (L) frame in the group of frames in the transmitted data communication to be sent. Bit three 156 of the control field byte 150 indicates whether a command (C) is being given informing the mobile station that the data link is being reset and a transition is being made back to a conventional acknowledged communications mode of operation. Bit two 158 of the control field byte 150 indicates whether the frame is being sent in accordance with the present invention in the unacknowledged (U) communications mode of operation. Finally, bit one 160 of the control field byte 150 is unused and set to zero.

In accordance with the process of the present invention, the transmit send sequence number (SSN) 152 of the control field byte 150 is reset for the transmission of a first frame in the group of frames to be sent. The transmit send sequence number 152 is then incremented with each subsequent transmission of a frame of the plurality of frames in the unacknowledged mode of operation. Furthermore, for each such frame sent, the bit two 158 of the control field byte 150 is set to one to indicate that no acknowledgment of mobile station receipt of the transmitted frame is required. When a last frame in the group of frames is sent, bit four 154 of the control field byte 150 is set. After the last frame in the unacknowledged group is sent, and responsive to poll message acknowledgment, the first frame of a subsequent transmission is sent with bit three 156 of the control field byte 150 set indicating to the mobile station a resetting of the data link. Absent a poll acknowledgment, no transition back to a conventional acknowledged communications mode of operation yet occurs. If desired, one frame may include a control field byte 150 setting of multiple ones of the bits two, three and/or four.

Figure 6:
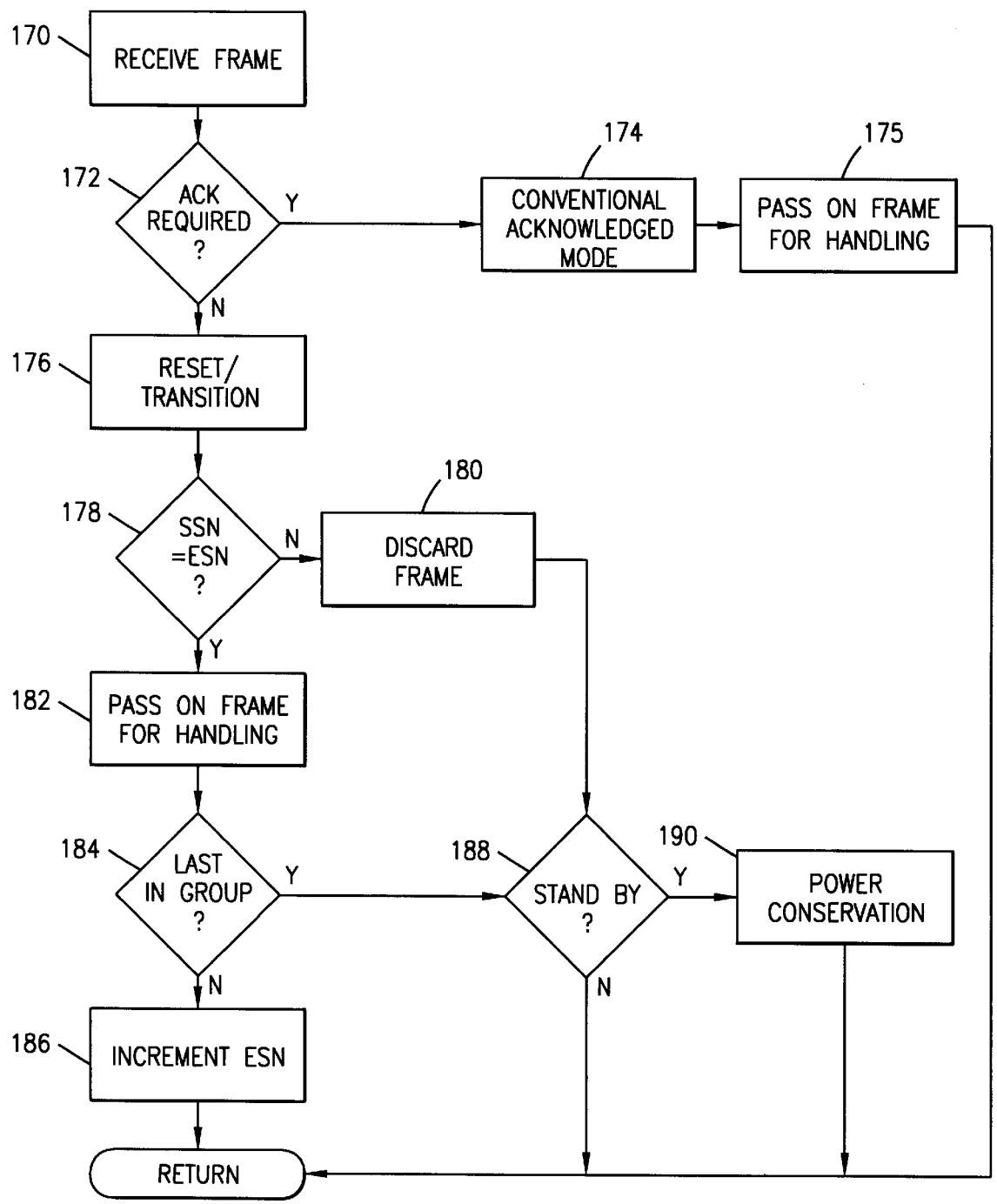
FIG. 6 is a flow diagram illustrating operation of a mobile station side of the wireless communications system of FIG. 1 to support the unacknowledged communications mode of operation of FIG. 3.

Reference is now made to FIG. 6 wherein there is shown a flow diagram illustrating operation of a mobile station side of the wireless communications system of FIG. 1 to support the unacknowledged communications mode of operation of FIG. 3. In step 170, a frame is received by the mobile station. In decision step 172, the control field byte of the received frame is examined to determine whether an acknowledgment of mobile station receipt of the transmitted frame is required. If yes, the process continues with a conventional acknowledged mode operation frame handling (step 174), passes the frame on for further, appropriate mobile station handling (step 175), and returns to step 170 to await reception of a next frame. If no acknowledgment is required, a resetting of the data link and a transition to an unacknowledged communications mode of operation is made in step 176. Next, a determination is made in decision step 178 as to whether the send sequence number (SSN) contained in the frame equals the expected sequence number (ESN) for the frame. If not, the received frame is discarded in step 180. If the send sequence number contained in the frame equals the expected sequence number for the frame (step 178), the received frame is passed on in step. 182 for further, appropriate mobile station handling. Next, a determination is made in step 184 as to whether the control field byte of the received frame indicates (L) that the received frame is a last frame in a group of transmitted frames. If no, the expected sequence number counter is incremented by one in step 186, and the process returns to step 170 to await reception of a next frame. If yes (step 184), or if it was decided to discard the received frame (step 180), a determination is made in decision step 188 as to whether the mobile station is in standby state. If not, the process returns to step 170 to await reception of a next frame. If yes, the mobile station initiates power conservation measures in step 190, and the process returns to step 170 to await reception of a next frame.

Pseudo code for foregoing mobile station operation process of FIG. 6 may be written as follows:

```
IF      U is set to 1
THEN    {
        IF      the SSN equals ESN
        THEN    {pass frame on for handling
                IF   L is set to 1, AND in standby state
                THEN power conservation measures
                ELSE increment ESN by 1}
        ELSE {discard received frame
                IF   in standby state
                THEN power conservation measures}
        }
```

Figure 7:
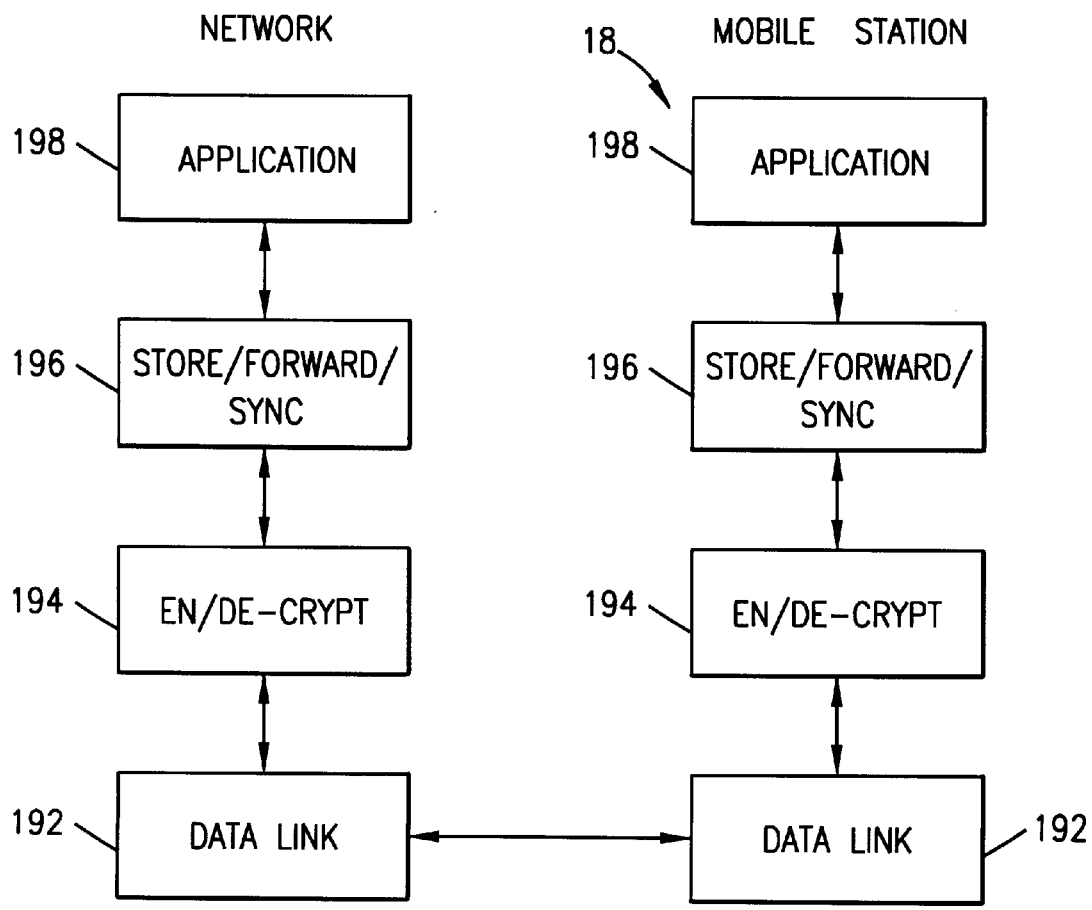
FIG. 7 is a diagram illustrating a layered communications model which supports data communications in accordance with the present invention.

Reference is now made to FIG. 7 wherein there is shown a diagram illustrating a layered communications model which supports data communications in accordance with the present invention. On one side of the model is represented in simplified fashion the layers of the base station 24. On the other side of the model, the layers of the mobile station 18 are represented (also in simplified fashion). Each side includes four layers. At the bottom is the data link layer 192 which is responsible for the physical communications connection between the network and mobile station 18. Typically, as is conventional operation, the data link layer utilizes an acknowledged mode of operation where data communications sent from base station 24 to mobile station 18 (or vice versa) are acknowledged by the receiving party. In accordance with the present invention, the data link layer 192 further supports an unacknowledged mode of operation used to communicate frames of a data communication without requiring the receiving party to acknowledge successful receipt. A next layer of the model is an encryption/decryption layer 194 which is responsible for encrypting (on the transmit side) and decrypting (on the receive side) the information contained in the data communications sent over the data link layer. A next layer of the model is a store/forward/synchronization layer 196 which is responsible for queuing on the transmit side frames of data communications sent in the unacknowledged mode until such time as a later synchronization with the receive side confirms delivery. A final layer of the model is an application layer 198 which generates the information encrypted and contained in the data communications sent over the data link layer (from the transmit side), that is decrypted and processed in accordance with a designated application (on the receive side).

A more complete understanding of certain aspects of the operation of the present invention may be had by examining its processes in the context of the layered communications model of FIG. 7. Typical operation of the data link layer 192 is in accordance with the International Standards Organization (ISO) seven layer model which requires an acknowledged mode of operation. This is because higher layers of the model typically do not include capabilities for policing successful message transmissions. In the present invention, however, the store/forward/synchronization layer 196 performs a policing function in that transmitted frames are stored (queued) until such time as delivery can be confirmed. The functionality performed by this policing layer 196 allows for the transitioning of the data link layer 192 from its conventional acknowledged operation mode to the unacknowledged operation mode of the present invention.

Although a preferred embodiment of the method of the present invention has been illustrated in the accompanying Drawings and described in the foregoing Detailed Description, it is understood that the invention is not limited to the embodiment disclosed, but is capable of numerous rearrangements, modifications and substitutions without departing from the spirit of the invention as set forth and defined by the following claims.

What is claimed is:

1. A method for delivering frames of a data communication from a transmit entity to a receive entity, comprising the steps of:
   polling by the transmit entity for the receive entity over a data link operating in an acknowledged mode;
   waiting for receipt of a polling acknowledgment from the receive entity; and
   responsive to a failure to receive the polling acknowledgment:
      transitioning operation of the data link to an unacknowledged mode; and
      sending a group of frames of the data communication from the transmit entity to the receive entity without requiring receive entity acknowledgment.

2. The method as in claim 1 further responsive to a failure to receive the polling acknowledgment further including the step of transitioning operation of the data link back to the acknowledged mode after sending the group of frames.

3. The method as in claim 1 further responsive to a failure to receive the polling acknowledgment further including the steps of:
   saving by the transmit entity of the sent group of frames;
   confirming successful delivery of the sent group of frames; and
   dropping the saved group of frames following confirmed delivery.

4. The method of claim 3 wherein the step of confirming comprises the steps of:
   requesting by the transmit entity of a receive entity confirmation of receipt; and
   receiving a confirmation acknowledgment from the receive entity.

5. The method of claim 1 further including the step of repeating the steps of polling and waiting a predetermined number of times before executing the steps of transitioning and sending.

6. The method as in claim 1 wherein the step of transitioning comprises the step of sending with each frame in the group of frames an indication that receive entity acknowledgment of the frame is not required.

7. The method as in claim 1 wherein the step of sending includes the step of sending with a last one of the frames in the group of frames an indication that the frame is the last frame in the group.

8. The method as in claim 7 further including the step of transitioning operation of the data link back to the acknowledged mode following the sending of the last frame in the group.

9. A communications system, comprising:
   a transmit entity;
   a receive entity; and
   a data link between the transmit entity and the receive entity, the data link operating in an acknowledged mode and in an unacknowledged mode, wherein:
      the transmit entity polls for the receive entity in acknowledged mode, and sends a group of frames of a data communication to the receive entity over the data link in unacknowledged mode following a receive entity failure to acknowledge the poll.

10. The system as in claim 9 wherein each frame in the sent group of frames includes an indication that receive entity acknowledgment of the frame is not required.

11. The system as in claim 9 wherein a last one of the frames in the group of frames includes an indication that the frame is the last frame in the group.

12. The system as in claim 9 wherein the transmit entity operates to store the sent group of frames of the data communication until such time as successful delivery of the group of frames to the receive entity can be confirmed.

13. A method for processing a received frame of a data communication, comprising the steps of:
   determining from an indication included with the frame whether receipt of the frame should be acknowledged;
   acknowledging the frame if indicated; and otherwise:
      comparing a sequence number for the frame with an expected sequence number;
      discarding the frame if the sequence numbers do not match; and
      passing on the frame for further handling if the sequence numbers do match.

14. The method as in claim 13 further including the steps of:
   determining from an indication included with the frame whether the frame is a last frame in a group of transmitted frames; and
   waiting for a next frame if the frame is not the last frame.

15. The method as in claim 14 wherein the method is executed by a mobile station operating in a wireless communications system, and further includes the steps of:
   determining whether to implement power conservation measures after either discarding the frame or identifying the frame as the last frame in the group; and
   taking power conservation measures if the determination is affirmative.

* * * * *